Oct. 4, 1927.
H. D. CHURCH
1,644,654
SHOCK ABSORBER FOR VEHICLES
Original Filed Feb. 15, 1923
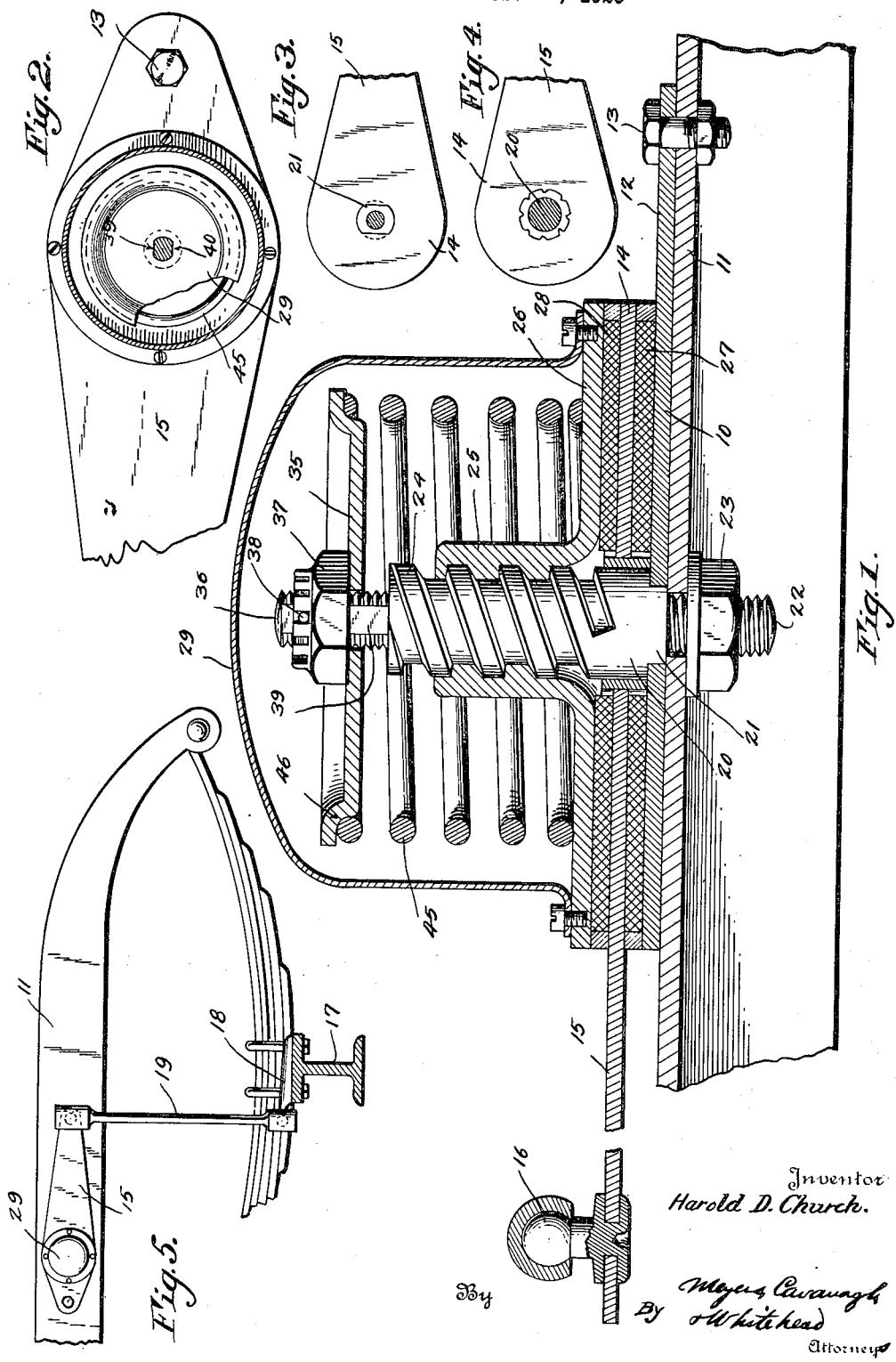
Inventor
Harold D. Church.

Patented Oct. 4, 1927.

1,644,654

UNITED STATES PATENT OFFICE.

HAROLD D. CHURCH, OF FAIRFIELD, CONNECTICUT, ASSIGNOR OF ONE-THIRD TO CHARLES MARCUS, OF NEW YORK, N. Y., AND ONE-THIRD TO RAYMOND P. LANSING, OF MONTCLAIR, NEW JERSEY.

SHOCK ABSORBER FOR VEHICLES.

Application filed February 15, 1923, Serial No. 619,158. Renewed March 3, 1927.

My invention relates to shock absorbers for vehicles of the general type disclosed in a previous application of Charles Marcus, Serial No. 600,082, filed November 10, 1922, with important modifications and improvements.

An important object of the invention is to provide a simple, strong and durable shock absorber of the type referred to in which the frictional resistance opposed to relative movement of the vehicle frame and axle in one direction is greater than the resistance opposed to such movement in the other direction, and in which the active force producing frictional resistance is provided to a certain extent by the thrust action of a spring with corresponding reduction of the work done by inclined surfaces such as screw threads.

The characteristics and advantages of the invention are best explained in connection with the following detail description of the accompanying drawings, which illustrate one exemplifying embodiment of the invention. After considering this exemplification, persons skilled in the art will understand that modifications may be made within the principles of the invention; and I contemplate the employment of any structures that are properly within the scope of the appended claims.

In the drawings:

Figure 1 is a longitudinal section of an appliance embodying the invention.

Figure 2 is an end elevation.

Figure 3 and 4 are sectional details.

Figure 5 is a view in side elevation of sufficient parts of a motor vehicle to illustrate one mode of applying the invention structure thereto.

The shock absorber structure comprises a friction plate 10 adapted to be connected or secured to a vehicle frame member such as 11 and also having an arm 12 which may be secured to the frame member by a screw 13 to prevent rotation of the friction plate; another friction plate 14 having an arm 15 provided with a ball-end fitting 16 adapted to be connected to the vehicle axle 17 or an axle fitting 18 by means of a link 19 (Fig, 5); a spindle 20 having a member 21 non-rotatively secured in a hole in plate 10 and provided with a screw-threaded extension 22 engaged by a nut 23 to secure the spindle to the plate, and which may at the same time secure the plate to the vehicle frame; a relatively steep-pitch screw thread, or usually a plurality of screw threads 24, on the spindle; a nut 25 running on the spindle in engagement with the spindle threads and having a flange 26; friction disks 27 and 28 between adjacent friction surfaces of the plates and the nut flange; and a housing 29 detachably secured to the nut flange, all of which may be substantially as in the above identified application. The nut, or its flange, may be identified in some cases, as a "pressure member".

The present invention includes means for amplifying the effect of cooperating inclined surfaces such as the screw threads on the spindle and in the nut, in one direction of movement of the friction plates, and for decreasing the effect of those parts in the other direction of movement, said means being embodied in the present example as follows:

A spring abutment or washer 35 is apertured to fit over a screw threaded outward extension 36 of the spindle, and is adjusted longitudinally of the spindle and retained in adjusted position by a nut 37. Desirably the nut is castellated to cooperate with a cotter pin 38 passing through a hole or one of a series of holes in the spindle extension to lock the nut in adjusted position. The spring abutment 35 may be secured against rotation if desired by cooperating flat surfaces 39 and 40 provided on the spindle extension 36 and in the washer aperture respectively. A helical spring 45 is compressed between the spring abutment 35 and nut flange 26, and desirably the peripheral portion of the abutment washer is dished to provide an annular spring seat 46 to prevent lateral shifting of the spring.

The screw-thread angle is usually relatively steep to insure against locking the parts in frictional engagement when the nut is moved in the clamping direction. The angle of the thread, and also the diameter of the spring and its effective length and pressure or thrust are calculated for the service in view, with due regard to the mass of the vehicle frame or body and axle structure, average load, and other conditions.

The appliance may be arranged to give the maximum friction resistance to divergent movement of the vehicle frame and axle, or to give maximum resistance to convergent movement of those members, and in either case a much reduced resistance will be afforded to the other direction of movement of the vehicle members. In this way the shock absorber appliance can be utilized to give a maximum predetermined resistance to vehicle spring recoil or to vehicle spring compression, with a reduced resistance to the opposite spring movement.

Assuming that the appliance as viewed in Fig. 1 is located above the vehicle axle, when the road wheel of the vehicle encounters an obstruction tending to move the axle upward in relation to the frame, arm 15 is moved towards the eye of the observer in Fig. 1. Frictional engagement of disk 28 with plate 14 and nut flange 26 causes the nut to rotate "backward" slightly on the spindle, and the screw threads thereupon tend to retract the nut and flange slightly and to relieve pressure between the friction surfaces. A substantial amount of friction pressure is, however, maintained during this movement by the thrust action of spring 45, which may be adjusted as desired within considerable limits, this spring thrust always tending to run the nut inward on the spindle. The recoil of the vehicle spring moves arm 15 in the opposite direction or away from the eye of the observer in Fig. 1, and after a short angle of movement required to take up any clearance between the spindle and nut threads, the angularity of the screw threads forces the nut and nut flange powerfully toward plate 10, producing the maximum predetermined frictional resistance to relative movement of the vehicle frame and axle, the friction effect provided by the angularity of the screw threads being amplified by the thrust of the spring 45. Otherwise described, the spring during the last stated movement of arm 15 tends to relieve the pressure between the spindle and nut threads and to make the action of the device smoother and more certain, regardless of minor irregularities in the screw thread surfaces and of varying conditions of lubrication.

The appliance may be otherwise arranged, by reversing its position or by substituting a right-hand screw and nut, to exert the maximum effect to retard vehicle-spring compression, and in such cases the lesser frictional resistance will be exerted to check spring expansion or recoil.

Adjustment of the spring abutment axially also serves to regulate the action of the appliance within considerable limits without any change in the screw or nut. Without other changes, however, the action of the appliance may evidently be changed considerably by substituting another screw and appropriate nut having threads of a different angularity.

In the above identified application, a spring is employed which acts by torsional effect to control the movement of the nut, similar to nut 25 in the present application, this spring having no direct thrust action, although by urging the nut rotatively on the spindle it tends to move the nut axially of the spindle and thus creates a certain thrust effort tending to produce frictional contact of the plates. In the present case the spring has no, or only a negligible torsional effect, but has a substantial and usually a quite powerful thrust action always tending to maintain the friction surfaces of the appliance in contact, and also serving to control the action of the nut so that when arm 15 moves in the direction tending to rotate the nut in the clamping direction, the nut flange and the nut move along with arm 15 and its friction plate 14, and quickly thereafter the screw action provides the maximum frictional retardation in the prescribed direction of movement. In the other direction of movement the spring thrust tends to carry the nut along with friction plate 14, bringing the opposite faces of the screw threads in contact, and the screw action tends to retract the nut to a certain extent against the action of the spring and so to relieve the friction surfaces, to a corresponding degree, of pressure caused by the spring thrust.

I claim:

1. A vehicle-spring-action-controlling appliance comprising two relatively movable friction members, a compression spring tending to urge the members into frictional engagement, and frictionally actuated means acting in one direction of relative movement of the members to amplify the frictional effect, and acting in the other direction of movement to reduce the frictional effect of the spring means.

2. A shock absorber for vehicles comprising two relatively movable friction plates, a compression spring arranged to exert thrust to urge the members into frictional engagement, and means including an inclined member in fixed relation to one of the plates and a frictionally actuated pressure member cooperating with said inclined member acting in one direction of relative movement of the plates to amplify the frictional effect, and acting in the other direction of movement to reduce the frictional effect of the spring means.

3. A shock absorber for vehicles comprising two relatively movable friction plates, a spindle element fixed against rotation in relation to one of said friction members and having an operating surface inclined to the plane of said member, a frictionally actuated pressure member cooperating with said inclined surface, and a thrust spring exerting pressure upon the pressure member tending to amplify the frictional effect produced by the inclined surface acting in one direction, and the inclined surface acting to reduce the effective thrust of the spring in the other direction of movement.

4. A shock absorber for vehicles comprising a friction plate adapted to be connected to a vehicle member, another relatively movable friction plate adapted to be connected to another relatively movable vehicle member, a spindle non-rotatively secured in relation to one of the plates, a screw thread on the spindle, a nut engaging the screw thread and having frictional engagement with said movable plate and arranged to urge the plates together, and a thrust spring acting on the nut and exerting pressure urging the nut to active position.

5. A shock absorber for vehicles comprising a friction plate adapted to be connected to a vehicle member, another relatively movable friction plate adapted to be connected to another relatively movable vehicle member, a spindle non-rotatively secured in relation to one of the plates, a steep pitch screw thread on the spindle, a nut engaging the screw thread and having a circular flange opposed to the second-named plate and arranged to urge the plates together, friction discs between adjacent surfaces of the plates and said flange, and a thrust spring acting on the nut and exerting thrust pressure urging the nut to active position.

6. A shock absorber for vehicles comprising a friction plate adapted to be connected to a vehicle frame member, a spindle non-rotatively secured to the plate, another friction plate mounted for rotation about the spindle and adapted to be connected to a vehicle axle, a screw thread on the spindle, a nut engaging the thread and having a flange confronting the last-named friction plate, a spring abutment connected to the outward end of the spindle, and a spring acting between the spring abutment and the nut flange.

7. A shock absorber for vehicles comprising a friction plate adapted to be connected to a vehicle frame member; a spindle non-rotatively secured to the plate, another friction plate mounted for rotation about the spindle and adapted to be connected to a vehicle axle, a screw thread on the spindle, a nut engaging the thread and having a flange confronting the last-named friction plate, a spring abutment connected to the outward end of the spindle, a spring acting between the spring abutment and the nut flange, and means admitting adjustment of the spring abutment.

8. A shock absorber for vehicles comprising a friction plate adapted to be connected to a vehicle frame member, a spindle non-rotatively secured to the frame plate, another friction plate mounted for rotation about the spindle and adapted to be connected to a vehicle axle, a friction disc between the plates, a steep pitch screw threaded on the spindle, a nut engaging the thread and having a flange confronting the last-named friction plate, a friction disc between said flange and the adjacent plate, a spring abutment connected to the outward end of the spindle, and a helical spring compressed between the spring abutment and the nut flange.

9. A shock absorber for vehicles comprising a friction plate adapted to be connected to a vehicle frame member, a spindle non-rotatively secured to the frame plate, another friction plate mounted for rotation about the spindle and adapted to be connected to a vehicle axle, a friction disk between the plates, a steep pitch screw threaded on the spindle, a nut engaging the thread and having a flange confronting the last-named friction plate, a friction disk between said flange and the adjacent plate, a spring abutment connected to the outward end of the spindle, and a helical spring compressed between the spring abutment and the nut flange, and means for adjusting the spring abutment axially of the spindle.

10. In a shock absorber or spring check for vehicles, a first friction plate, a second relative oscillatable friction plate, a pressure member having frictional engagement with said second plate and arranged to cause application of retarding friction between the first and second plates, a compression spring exerting thrust to urge the pressure member to frictional engagement, and an inclined actuating member in non-rotative relation to the first plate and cooperating with the pressure member so that the pressure member is actuated by frictional engagement with the second plate when the latter is moved in either direction from any operative position, and the thrust spring and inclined member cooperate to apply a maximum frictional retarding effect to the second plate in one direction of movement and a smaller frictional retarding effect in the other direction of movement.

11. A shock absorber for vehicles comprising two relatively movable friction members, an element fixed against rotation in relation to one of said friction members and having an operating surface inclined to the plane of said member, a movable pressure member co-operating with said inclined surface and having frictional engagement with one of said friction members, and a thrust spring exerting pressure upon the pressure member tending to amplify the frictional effect produced by the inclined surface in one direction and the inclined surface tending to reduce the spring thrust effect in the other direction of movement.

Signed at New York in the county of New York and State of New York this 31st day of January A. D. 1923.

HAROLD D. CHURCH.